United States Patent
Latenstein Van Voorst

(10) Patent No.: US 6,859,934 B2
(45) Date of Patent: Feb. 22, 2005

(54) SCANNING DEVICE COMPRISING A MAGNETICALLY GUIDED LINEAR MOTOR

(75) Inventor: Andre Latenstein Van Voorst, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 513 days.

(21) Appl. No.: 09/930,036

(22) Filed: Aug. 15, 2001

(65) Prior Publication Data

US 2002/0021654 A1 Feb. 21, 2002

(30) Foreign Application Priority Data

Aug. 16, 2000 (EP) ............................................. 00202874

(51) Int. Cl.⁷ .............................................. G11B 7/085
(52) U.S. Cl. ...................................................... 720/663
(58) Field of Search ................................ 369/215, 219, 369/244, 249; 360/78.12; 720/659, 660, 663, 666

(56) References Cited

U.S. PATENT DOCUMENTS

| | | | | |
|---|---|---|---|---|
| 5,187,702 A | * | 2/1993 | Takahashi | 369/215 |
| 5,289,088 A | * | 2/1994 | Andoh | 318/135 |
| 5,587,852 A | * | 12/1996 | Yoshiura et al. | 360/78.12 |

OTHER PUBLICATIONS

Research Disclosure, Sep. 1999, Publication No. 42527, "Three Phase Linear Motor".

* cited by examiner

Primary Examiner—David L. Ometz
(74) Attorney, Agent, or Firm—Michael E. Belk

(57) ABSTRACT

A scanning device for a disc-shaped information carrier about an axis of rotation having a linear motor that can displace the scanning unit in a radial direction. The linear motor comprises a first part and a second part guided with respect to each other in the radial direction by a straight guide. The first part comprises pairs of magnets having opposite directions of magnetization. The second part includes an electric coil system with winding portions. The linear motor is further provided with a control unit for controlling an electric current in the coil system. The control unit controls electric current in the winding portions if the winding portion is present in a magnetic transition region between the pair of magnets, resulting in a Lorentz force in the winding portion, substantially perpendicularly to the straight guide. The Lorentz force is used to fix the degrees of freedom of the second part with respect to the first part. The straight guide has a single guide shaft and the Lorentz force is used to fix a rotational degree of freedom of the second part about the shaft.

15 Claims, 3 Drawing Sheets

SCANNING DEVICE COMPRISING A MAGNETICALLY GUIDED LINEAR MOTOR

Figure 1:
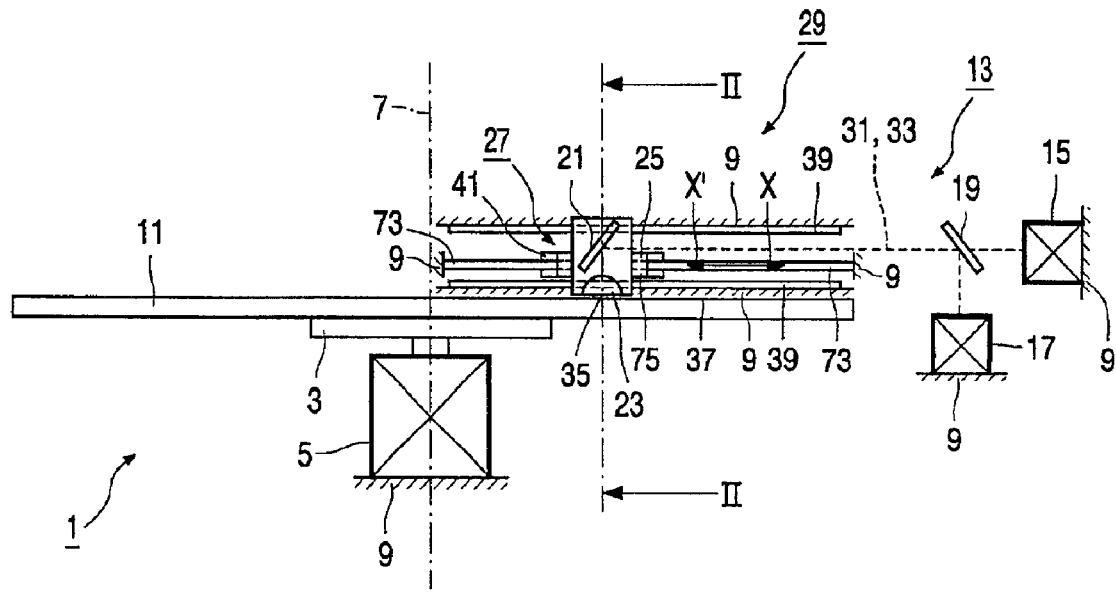

The invention relates to a scanning device for scanning a disc-shaped information carrier, which scanning device is provided with a table which can be rotated about an axis of rotation and on which an information carrier can be placed, and with a scanning unit, and a linear motor by means of which the scanning unit can be displaced with respect to the table predominantly in a radial direction, which linear motor is provided with a first and a second part which are displaceably guided with respect to each other by means of a straight guide, the first part being provided with pairs of magnets having opposite directions of magnetization directed substantially perpendicularly to the guide, and the second part being provided with an electric coil system comprising winding portions extending substantially perpendicularly to the directions of magnetization and perpendicularly to the guide, and the linear motor being provided with a control unit for controlling an electric current in the coil system.

A scanning device of the type mentioned in the opening paragraph is disclosed in Research Disclosure, September 1999, publication no. 42527. The known scanning device is a player for reading and/or writing an optically scannable information carrier, such as a CD or DVD. The scanning unit of the known scanning device includes a laser source, an objective lens and an optical detector. In operation, rotation of the table supporting the information carrier to be scanned about the axis of rotation and, simultaneously, displacement of the scanning unit by means of the linear motor in the radial direction take place such that the scanning unit follows a spiral-shaped information track present on the information carrier. The linear motor is a three-phase commutated linear motor. The first part of the linear motor is secured to a frame of the scanning device and comprises a row of permanent magnets extending parallel to the radial direction and having successively opposite directions of magnetization at right angles to the radial direction. The second part of the linear motor is secured to a slide on which also the scanning unit is secured and comprises three electric coils. The straight guide, by means of which the slide with the second part of the linear motor is guided in the radial direction with respect to the frame and the first part of the linear motor, comprises two round shafts which are secured to the frame and extend in a direction parallel to the radial direction, said shafts extending through two guide bushings provided in the slide. In operation, the control unit of the linear motor allows an electric current to enter the coils at any moment in time, the winding portions of said coils extending substantially perpendicularly to the directions of magnetization and perpendicularly to the guide being situated right opposite one of the magnets. At that moment in time, said winding portions are situated in a part of the magnetic field of the relevant magnet where the magnetic field lines are directed approximately parallel to the direction of magnetization, so that interaction between the current through these winding portions and the magnetic field causes a Lorentz force to be generated, which extends substantially parallel to the guide, and under the influence of which the slide is displaced in the radial direction along the guide. In operation, the control unit does not allow current to enter the coils whose winding portions, extending substantially perpendicularly to the directions of magnetization and perpendicularly to the guide, are situated in the transition region between two magnets, because in this part of the magnetic field Lorentz forces extending parallel to the guide cannot be generated. By means of the linear motor of the known scanning device, comparatively large accelerations of the slide can be achieved in operation, so that the linear motor enables the slide to be displaced between two different radial positions within a comparatively short access time.

In the known scanning device, five of the six degrees of freedom of the slide with respect to the frame are fixed by co-operation of the two shafts of the guide and the guide bushings provided in the slide. The sixth degree of freedom, i.e. the position of the slide in the radial direction, is fixed by means of the linear motor. A drawback of the known scanning device resides in that friction forces act between both shafts and the guide bushings co-operating therewith. These friction forces have a negative influence on the achievable access times of the slide and on the dynamic behavior of the slide.

It is an object of the invention to provide a scanning device of the type mentioned in the opening paragraph, by means of which said drawback of the known scanning device can be precluded as much as possible.

To achieve this object, a scanning device in accordance with the invention is characterized in that, in operation, the control unit admits an electric current to at least one of said winding portions and controls said electric current, if said winding portion is situated in a magnetic transition field between two adjacent magnets having opposite directions of magnetization. In said magnetic transition field, the magnetic field lines are arc-shaped and extend, right opposite the boundary between the two adjacent magnets, substantially perpendicularly to the directions of magnetization of the magnets. As, in operation, the control unit allows an electric current to enter at least one of the winding portions of the coil system which extend substantially perpendicularly to the directions of magnetization and perpendicularly to the guide, and also controls said electric current, if the relevant winding portion is situated in said magnetic transition field, a Lorentz force directed substantially parallel to the directions of magnetization of the magnets is generated in the relevant winding portion by interaction between the current through this winding portion and said magnetic transition field. Apart from a Lorentz force which is directed parallel to the guide, also a Lorentz force which is directed parallel to the directions of magnetization, i.e. perpendicularly to the guide, is generated in this manner on the second part of the linear motor, thereby enabling two of the six degrees of freedom of the second part to be fixed with respect to the first part by means of the linear motor. The straight guide of the scanning device in accordance with the invention thus only has to fix four of the six degrees of freedom of the second part with respect to the first part. This can be achieved, for example, by means of a straight guide comprising only a single round shaft, which is secured to the first part, and a single guide bushing or two comparatively closely spaced guide bushings, which are secured to the second part. In this manner, the friction forces between the two parts of the linear motor are limited substantially, as a result of which the achievable access times and the dynamic behavior of the linear motor are improved substantially. In addition, a loss of output power of the linear motor caused by the friction forces is limited substantially. As the straight guide of the linear motor is simplified substantially, the construction of the scanning device in accordance with the invention is also simplified substantially.

A particular embodiment of a scanning device in accordance with the invention is characterized in that the guide comprises a single round shaft and at least one bushing provided around said shaft. In this particular embodiment, the straight guide causes two mutually perpendicular linear degrees of freedom of the second part extending perpendicularly to the shaft to be fixed with respect to the first part, and two degrees of freedom of rotation of the second part to be fixed with respect to the first part about two mutually perpendicular axes of rotation extending perpendicularly to the shaft. The linear motor causes a linear degree of freedom of the second part with respect to the first part to be fixed, which linear degree of freedom extends parallel to the shaft, and the linear motor causes a degree of freedom of rotation of the second part with respect to the first part about an axis of rotation coinciding with the shaft to be fixed.

A further embodiment of a scanning device in accordance with the invention is characterized in that the linear motor comprises a sensor for measuring a mutual position of the two parts of the linear motor in a direction parallel to the directions of magnetization, and in that the control unit comprises a control loop for adjusting a desired mutual position of the two parts by means of a signal supplied by the sensor, which signal corresponds to a measured mutual position of the two parts. The use of said sensor and said control loop enables the desired mutual position of the two parts of the linear motor to be accurately adjusted in the direction parallel to the directions of magnetization, and said desired position is accurately maintained.

Yet another embodiment of a scanning device in accordance with the invention is characterized in that the control unit uses the measured mutual position of the two parts of the linear motor to determine a mutual inclination of the two parts about said shaft, while the control loop uses the measured inclination to adjust a desired mutual inclination of the two parts about said shaft. In this manner, said inclination, i.e. the degree of freedom of rotation of the second part with respect to the first part of the linear motor about said shaft can be accurately adjusted and maintained. In addition, the control loop can be used to preclude an undesirable local inclination of the information carrier with respect to the scanning unit about an inclination shaft directed parallel to the radial direction. To this end, the control loop adjusts a desired mutual inclination of the two parts of the linear motor, which corresponds to a local inclination of the information carrier with respect to the scanning unit, which local inclination is measured by means of a further sensor.

A particular embodiment of a scanning device in accordance with the invention is characterized in that the coil system comprises at least three electric coils, which each include two parts having winding portions extending substantially perpendicularly to the directions of magnetization and perpendicularly to the guide, a pitch which substantially corresponds to a pitch between two adjacent magnets having opposite directions of magnetization being present between the two parts of each coil, and a pitch which is substantially equal to 2/3 or 4/3 times the pitch between said two magnets being present between each pair of coils of the three coils. In each position of the second part with respect to the first part, said winding portions of two of the three coils of said coil system are situated in a part of the magnetic field where the magnetic field lines are directed substantially parallel to the directions of magnetization, and said winding portions of one of the three coils are situated in said magnetic transition region having magnetic field lines which are directed substantially perpendicularly to the directions of magnetization. Thus, in each position of the second part with respect to the first part, two of the three coils are available for generating a driving force directed parallel to the straight guide, and one of the three coils is available for generating a guiding force directed parallel to the directions of magnetization. By virtue thereof, said driving force and said guiding force are continuously available when the second part is displaced with respect to the first part, so that, with the aid of a suitable control of the electric currents through the three coils, a uniform, continuous driving force and guiding force are available.

A further embodiment of a scanning device in accordance with the invention is characterized in that the sensor comprises three Hall sensors, which each measure the strength of a magnetic field originating from the magnets and present near, respectively, one of the three coils. By means of the three Hall sensors it is possible to accurately measure a position of the second part with respect to the first part in a direction parallel to the straight guide as well as a position of the second part with respect to the first part in a direction parallel to the directions of magnetization.

Yet another embodiment of a scanning device in accordance with the invention is characterized in that the first part of the linear motor is provided with two rows of permanent magnets extending substantially parallel to the guide, the pitch between said permanent magnets being substantially constant, each pair of adjoining magnets of each row having opposite directions of magnetization, the two rows being arranged, viewed in a direction parallel to the directions of magnetization, at some distance from each other, and each pair of oppositely arranged magnets of the two rows having equal directions of magnetization, and said winding portions of the coil system, viewed in a direction parallel to the magnetization direction, being situated between the two rows so as to be closer to one row than to the other row. By using said two rows of permanent magnets, a very strong magnetic field is provided between the two rows, so that very large Lorentz forces can be exerted on the coil system. As said winding portions of the coil system are situated closer to one row than to the other row, the coil system is situated partly in the magnetic transition fields having arc-shaped field lines, which transition fields are present between adjoining magnets of the nearest row, in which transition fields the necessary Lorentz forces extending parallel to the directions of magnetization can be generated.

These and other aspects of the invention will be apparent from and elucidated with reference to the embodiment(s) described hereinafter.

Figure 2:
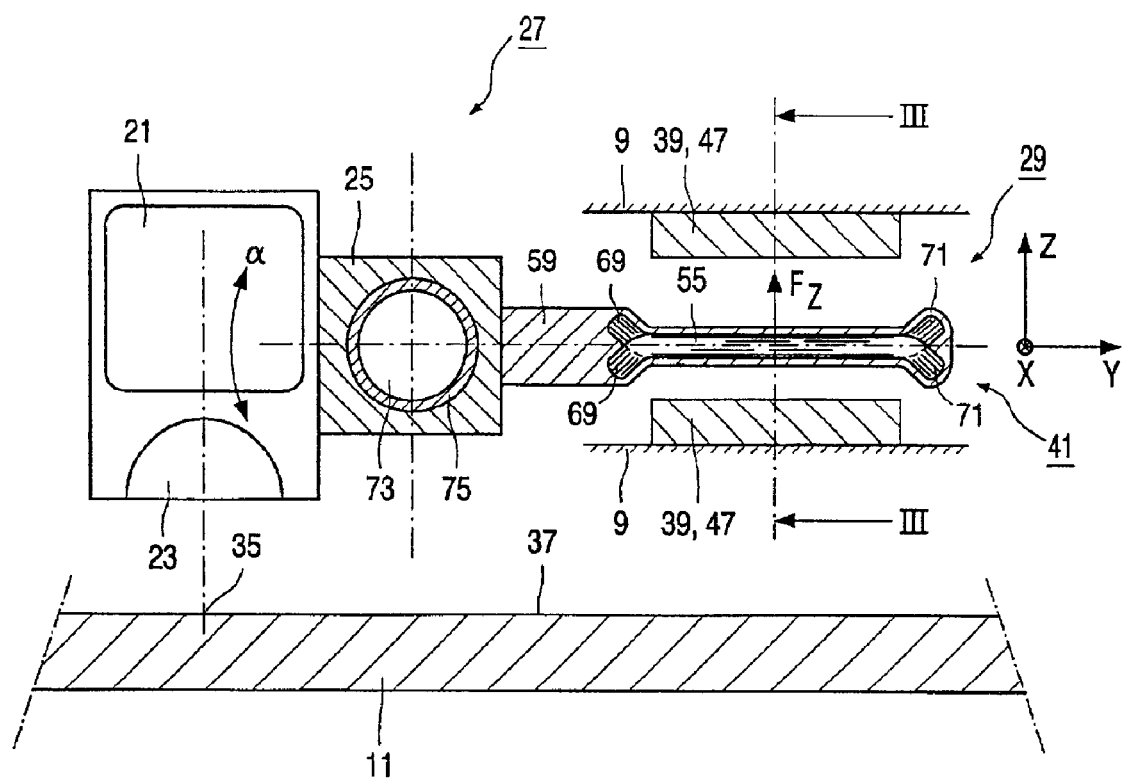
Figure 3:
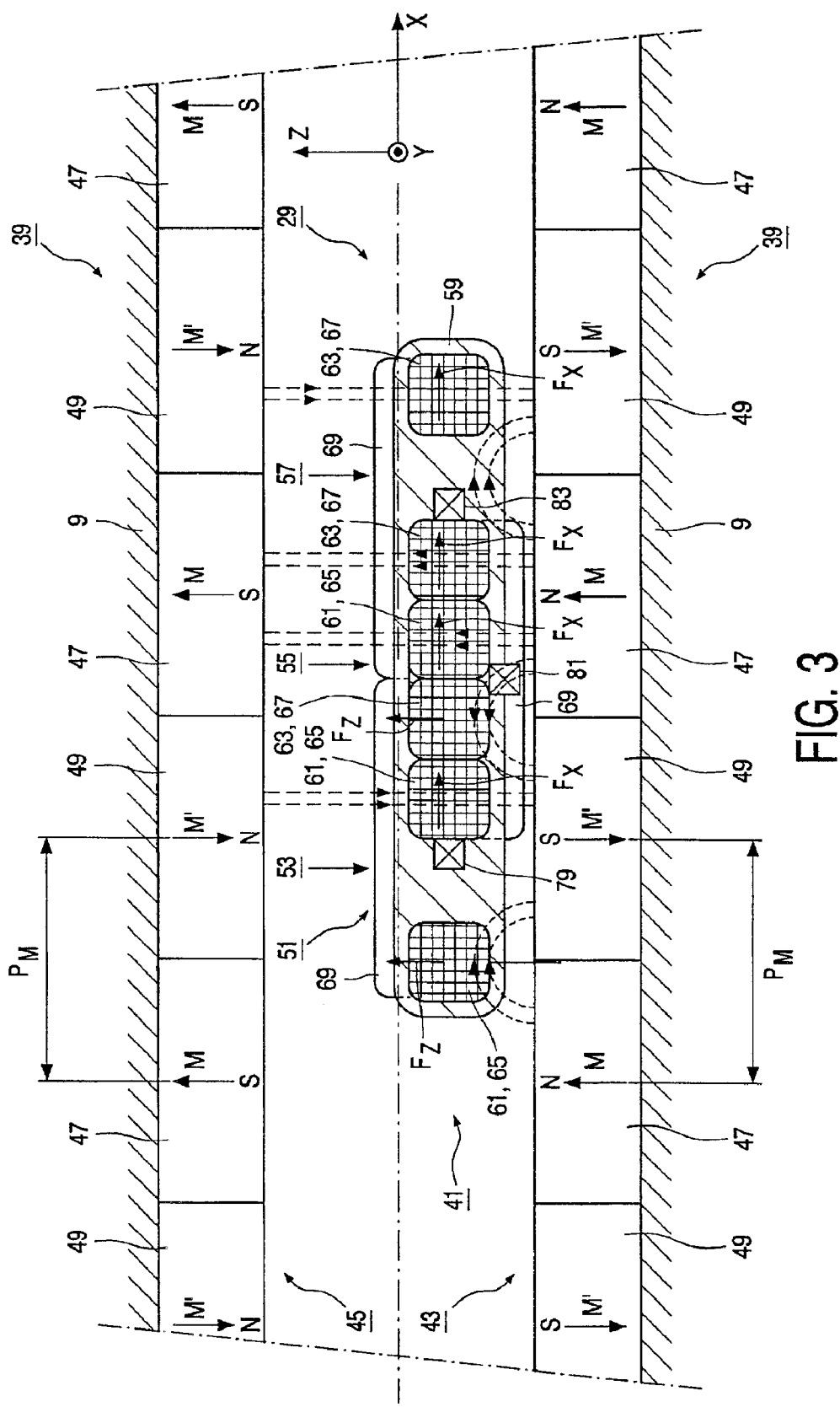
Figure 4:
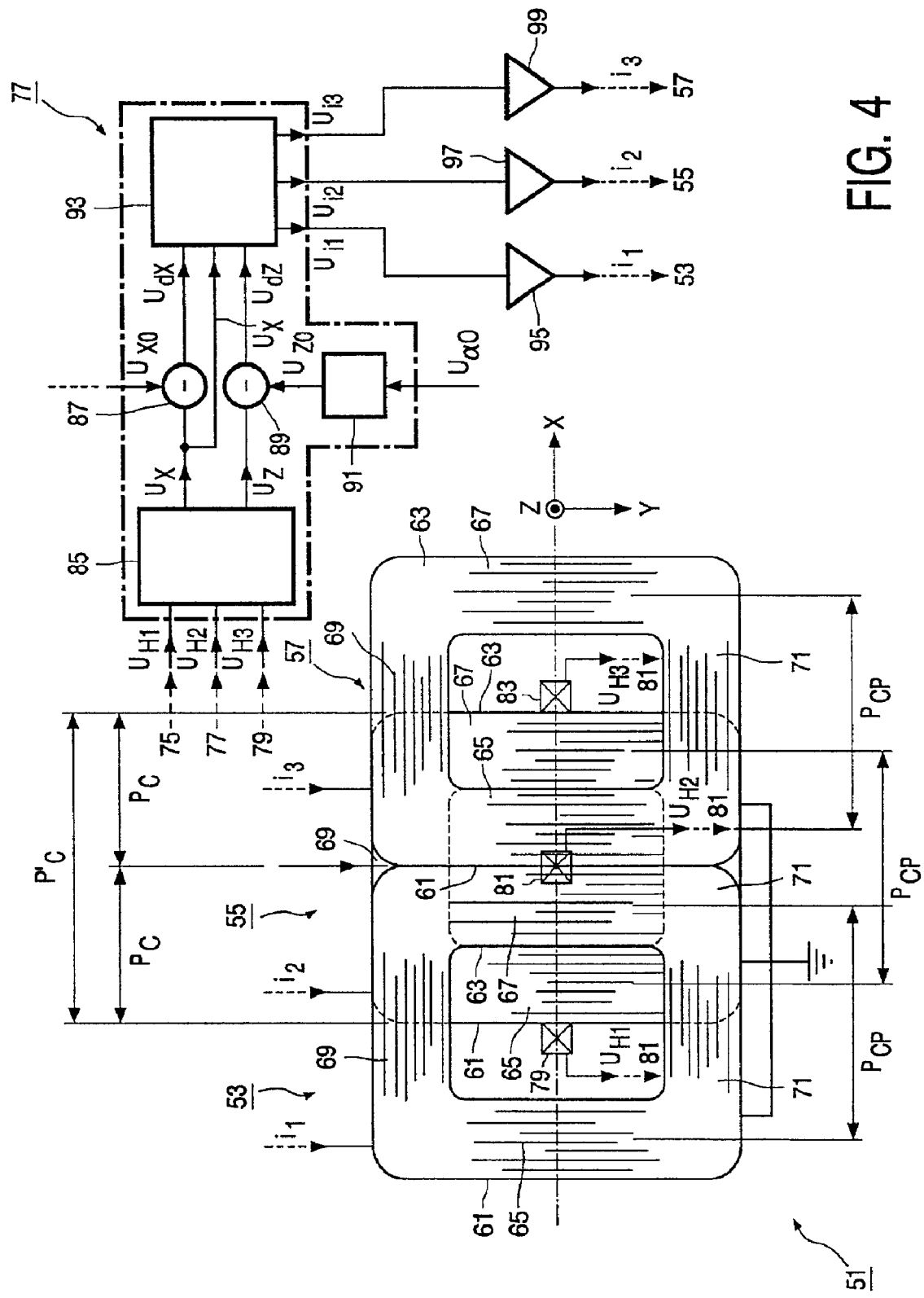

In the drawings:

FIG. 1 diagrammatically shows a scanning device in accordance with the invention, FIG. 2 is a diagrammatic, cross-sectional view of the scanning device taken on the line II—II in FIG. 1, FIG. 3 is a diagrammatic, cross-sectional view of a linear motor of the scanning device taken on the line III—III in FIG. 2, and FIG. 4 diagrammatically shows an electric coil system and a control unit of the linear motor shown in FIG. 3.

FIG. 1 diagrammatically shows a scanning device 1 in accordance with the invention, which is provided with a turntable 3 which can be rotated, by means of an electric motor 5, about an axis of rotation 7 extending substantially perpendicularly to the turn table 3. The motor 5 is secured to a frame 9 of the scanning device 1. A disc-shaped information carrier 11 can be placed on the turntable 3, which information carrier is an optically scannable information carrier, such as a CD or DVD, in the example shown. The scanning device 1 comprises a scanning unit 13 for scanning the information carrier 11, i.e. for reading information present on the information carrier 11 and/or writing information on the information carrier 11. For this purpose, the scanning unit 13 comprises a laser source 15, an optical detector 17 and a laser beam splitter 19, which are also secured to the frame 9. The scanning unit 13 further includes a mirror 21 and an objective lens 23, which are secured to a slide 25. The slide 25 is displaceably guided by means of a straight guide 27 in an X-direction which is radially directed with respect to the axis of rotation 7, and said slide can be displaced in the X-direction, and in an opposite X'-direction, by means of a linear motor 29. In operation, the laser source 15 generates a laser beam 31 which extends, via the laser beam splitter 19, along a laser beam path 33 extending parallel to the X-direction and radially with respect to the axis of rotation 7. The laser beam 31 is deflected by the mirror 21 and focused to a scanning spot 35 on an information layer 37 present on the information carrier 11 by the objective lens 23. The laser beam 31 is reflected by the information layer 37 and guided to the detector 17 via the objective lens 23, the mirror 21, the radial laser beam path 33 and the laser beam splitter 19. The rotation of the turntable 3 supporting the information carrier 11 by the motor 5 about the axis of rotation 7 and, simultaneously, the displacement of the slide 25 with the objective lens 23 by the linear motor 29 in the X-direction are carried out such that the scanning spot 35 follows a spiral-shaped information track present on the information layer 37, so that by means of a continuous laser beam 31 information present on the information track can be detected by the detector 17 and/or information can be written on the information track by means of a modulated laser beam 31.

In the example shown, the linear motor 29 is a three-phase commutated linear motor comprising a first part, which is secured to the frame 9, and a second part 41, which is secured to the slide 25 and hence is displaceably guided with respect to the first part 39 in the X-direction by means of the straight guide 27. As shown in FIG. 2 and FIG. 3, the first part 39 of the linear motor 29 comprises two rows 43, 45 of permanent magnets 47, 49 extending substantially parallel to the X-direction, the pitch $p_M$ between the permanent magnets being substantially constant, which rows 43, 45, viewed parallel to a Z-direction, extend perpendicularly to the X-direction and parallel to the axis of rotation 7, and are arranged so as to be spaced some distance apart. The magnets 47, 49 of the two rows 43, 45 have, in succession, a magnetization direction M extending parallel to the Z-direction and an opposite direction of magnetization M', so that both rows 43, 45 include pairs of magnets 47, 49 having opposite directions of magnetization M, M' extending substantially perpendicularly to the X-direction. As shown in FIG. 3, the magnets 47, 49 are arranged such that magnets 47, 49 having an equal direction of magnetization M, M', are arranged straight opposite each other, viewed in a direction parallel to the Z-direction. As shown in FIG. 3 and FIG. 4, the second part 41 of the linear motor 29 comprises an electric coil system 51 including a first electric coil 53, a second electric coil 55 and a third electric coil 57 which, viewed in a direction parallel to the Z-direction, are arranged between the two rows 43, 45 of permanent magnets 47, 49. The three coils 53, 55, 57 are arranged in a coil holder 59 which is secured to the slide 25. As shown in FIG. 4, the three coils 53, 55, 57 substantially comprise rectangular windings, and each one of the coils includes a first part 61 and, viewed in the X-direction, a second part 63 arranged at a pitch pCP, said parts having winding portions 65 and winding portions 67, respectively, which extend substantially parallel to a Y-direction directed perpendicularly to the X-direction and perpendicularly to the Z-direction. The first part 61 and the second part 63 of each coil 53, 55, 57 are connected to each other by means of two side parts 69, 71 having winding portions extending substantially parallel to the X-direction. In the example shown, the pitch pCP is substantially equal to the pitch $p_M$ between the magnets 47, 49. A pitch $p_C$ is present between the first coil 53 and the second coil 55, and between the second coil 55 and the third coil 57, which pitch is substantially equal, in the example shown, to 2/3 times the pitch $p_M$ between the magnets 47, 49. Thus, between the first coil 53 and the third coil 57 there is a pitch $P'_C$ which is substantially equal to 4/3 times the pitch $p_M$ between the magnets 47, 49. As shown in FIG. 3, the first parts 61 and the second parts 63 of the three coils 53, 55, 57, viewed in a direction parallel to the Z-direction, are arranged in substantially equal positions between the two rows 43, 45 of permanent magnets 47, 49, the first parts 61 and the second parts 63 being situated closer to one of the rows, i.e. row 43 in the example shown, than to the other row, i.e. row 45 in the example shown. To bring about these equal positions of the first parts 61 and the second parts 63 between the two rows 43, 45, the two side parts 69, 71 of the first coil 53 and the third coil 57, as shown in FIG. 2 and FIG. 3, are bent towards the row 45, while the two side parts 69, 71 of the second coil 55 are bent towards the row 43, so that a necessary overlap is possible between the side parts 69, 71 of the second coil 55 and the side parts 69, 71 of the first coil 53 and the third coil 57.

As shown in FIG. 1 and FIG. 2, the straight guide 27 comprises only a single round shaft 73, which is secured to the frame 9 and extends substantially parallel to the X-direction, and a guide bushing 75 which is provided, substantially without clearance, around the shaft 73, which guide bushing is accommodated in the slide 25. As a result of co-operation between the single round shaft 73 and the guide bushing 75, the following degrees of freedom of the six degrees of freedom of the second part 41 of the linear motor 29 with respect to the first part 39 are fixed: a linear degree of freedom directed parallel to the Y-direction, a linear degree of freedom directed parallel to the Z-direction, a degree of freedom of rotation about an axis of rotation extending parallel to the Y-direction, and a degree of freedom of rotation about an axis of rotation extending parallel to the Z-direction. The remaining two degrees of freedom of the second part 41 with respect to the first part 39, namely a linear degree of freedom directed parallel to the X-direction and a degree of freedom of rotation about the round shaft 73, are fixed by the linear motor 29 in a manner which will be described in greater detail hereinbelow. As the linear motor 29 fixes two of the six degrees of freedom of the second part 41 and, consequently, the straight guide 27 only has to fix four of the six degrees of freedom of the second part 41, as a result of which the straight guide 27 of the example shown has to comprise only one shaft 73 and one guide bushing 75, the friction forces between the straight guide 27 and the second part 41 are limited substantially. It is to be noted that instead of the single guide bushing 75, it is alternatively possible, viewed in a direction parallel to the X-direction, to employ two spaced apart comparatively short guide bushings. The overall friction force between these two guide bushings and the shaft 73, however, would be comparable to the overall friction force between said single guide bushing 75 and the shaft 73. As the friction forces between the straight guide 27 and the second part 41 are comparatively small, and since there is no mechanical contact between the first part 39 and the second part 41 of the linear motor 29, the acceleration forces of the linear motor 29 are counteracted to a limited degree only by said friction forces. As a result, the access times needed by the linear motor 29 to displace the slide 25 between two radial positions is reduced substantially and, in addition, the dynamic behavior of the linear motor 29 is improved considerably.

Said two degrees of freedom of the second part 41 of the linear motor 29 with respect to the first part 39 are fixed by the linear motor 29 in the following manner. The linear motor 29 is provided with a control unit 77, which is diagrammatically shown in FIG. 4, for controlling an electric current $i_1$ in the first coil 53, an electric current $i_2$ in the second coil 55 and an electric current $i_3$ in the third coil 57. The linear motor 29 further comprises a first Hall sensor 79, a second Hall sensor 81 and a third Hall sensor 83, which are of a type which is known per se and customarily used, and which co-operate with the control unit 77. As shown in FIG. 3 and FIG. 4, the first Hall sensor 79 is arranged between the first part 61 and the second part 63 of the first coil 53 to measure a field strength, present near the first coil 53, of the magnetic field of the magnets 47, 49. The second Hall sensor 81 and the third Hall sensor 83 are arranged in a comparable manner to measure a field strength, present near, respectively, the second coil 55 and the third coil 57, of said magnetic field. As shown in FIG. 4, the three Hall sensors 79, 81, 83 generate, in operation, a first output signal $u_{H1}$, a second output signal $u_{H2}$ and a third output signal $u_{H3}$, respectively, which correspond to a field strength measured by, respectively, the first Hall sensor 79, the second Hall sensor 81 and the third Hall sensor 83. The output signals $u_{H1}$, $u_{H2}$, $u_{H3}$ form the input signals of a first processor 85 of the control unit 77, wherein a relation, such as a mathematical relation or a tabular relation, between the field strength of the magnetic field present between the rows 43 and 45 and the X-position and the Z-position is stored. By means of said relation and also by means of data on the geometry of the coil system 51 stored in the first processor 85, the first processor 85 determines the X-position and the Z-position of the three coils 53, 55, 57 from the output signals $u_{H1}$, $u_{H2}$, $u_{H3}$ in a manner which is known per se and commonly used. The first processor 85 supplies an output signal $u_X$, which corresponds to the X-position of the three coils 53, 55, 57 determined as described above, and an output signal $u_Z$, which corresponds to the Z-position of the three coils 53, 55, 57 determined as described above. The control unit 77 further comprises a first comparator 87 and a second comparator 89 which compare the output signals $u_X$ and $u_Z$ with, respectively, a signal $u_{X0}$ and a signal $u_{Z0}$, which correspond to, respectively, a desired X-position and a desired Z-position of the three coils 53, 55, 57. The signal $u_{X0}$ is supplied directly by a control member of the scanning device 1, which control member is not shown in FIG. 1 for the sake of simplicity, which control member controls, apart from the linear motor 29, also the motor 5 of the turntable 3. The signal $u_{Z0}$ is supplied by a second processor 91 of the control unit 77, which determines the desired Z-position of the three coils 53, 55, 57 between the rows 43 and 45 from a signal $u_{\alpha0}$ supplied by said control member, which signal corresponds to a desired angle α of the second part 41 with respect to the first part 39 about the shaft 73. The comparators 87 and 89 supply, respectively, an output signal $u_{dX}$ and an output signal $u_{dZ}$, which correspond to, respectively, a difference between the desired X-position and the measured X-position and a difference between the desired Z-position and the measured Z-position. The output signals $u_{dX}$ and $u_{dZ}$ form the input signals of a third processor 93 of the control unit 77. The third processor 93 generates three output signals $u_{i1}$, $u_{i2}$, $u_{i3}$, which correspond to, respectively, a desired current $i_1$ through the first coil 53, a desired current $i_2$ through the second coil 55 and a desired current $i_3$ through the third coil 57, by means of the output signals $u_{i1}$, $u_{i2}$, $u_{i3}$, the control unit 77 controls three amplifiers 95, 97 and 99, which generate, respectively, the desired currents $i_1$, $i_2$ and $i_3$.

The third processor 93 determines the three output signals $u_{i1}$, $u_{i2}$, $u_{i3}$ in such a manner that as a result of interaction between the currents $i_1$, $i_2$ and $i_3$ in the three coils 53, 55, 57 and the magnetic field of the magnets 47, 49, a Lorentz force $F_X$ and a Lorentz force $F_Z$ are generated which are directed parallel to, respectively, the X-direction and the Y-direction in such a manner that the measured X-position and Z-position become equal to the desired X-position and Z-position, so that the second part 41 of the linear motor 29 occupies, with respect to the first part 39, a desired X-position and angle α. To generate the force $F_X$, the control unit 77 allows predominantly an electric current to enter the coils of the coil system 51 of which the first parts 61 and the second parts 63, viewed in a direction parallel to the Z-direction, are each situated approximately straight opposite one of the magnets 47, 49. The third processor 93 determines, at any moment in time, which coils these are from the signal $u_X$. In the situation shown in FIG. 3, it is determined that these coils are the second coil 55 and the third coil 57. As, in the situation shown, the first parts 61 and the second parts 63 of the coils 55 and 57, viewed in a direction parallel to the Z-direction, are each situated approximately straight opposite one of the magnets 47, 49, said parts 61 and 63 are situated in a part of the magnetic field of the magnets 47, 49 where the magnetic field lines, as diagrammatically shown in FIG. 3, are directed substantially approximately parallel to the Z-direction. As a result of interaction between this part of the magnetic field and the currents $i_2$ and $i_3$ in the winding portions 65, 67, directed parallel to the Y-direction, of the coils 55, 57, a Lorentz force $F_X$ is exerted on said winding portions 65, 67, which Lorentz force is directed predominantly substantially parallel to the X-direction. In order to generate the force $F_Z$, the control unit 77 allows predominantly an electric current to enter the coils of the coil system 51 of which the first parts 61 and the second parts 63, viewed in a direction parallel to the X-direction, are situated in a boundary region between two adjacent magnets 47, 49 having opposite directions of magnetization M, M', respectively. The coils to which this applies are determined by the third processor 93 at any moment in time from the signal $u_X$. In the situation shown in FIG. 3, the coil to which this applies is the first coil 53. As, in the situation shown, the first part 61 and the second part 63 of the coil 53, viewed in a direction parallel to the X-direction, are each situated in a boundary region between two magnets 47, 49, and said parts 61, 63 are closer to row 43 than to row 45, said parts 61, 63 of the first coil 53 are each situated in a magnetic transition field between two adjacent magnets 47, 49 of the row 43. In said transition field, the magnetic field lines, as diagrammatically shown in FIG. 3, are approximately arc-shaped, the field lines extending right opposite the boundary between two adjacent magnets 47, 49 in a direction predominantly substantially parallel to the X-direction. As a result of interaction between this part of the magnetic transition field and the current $i_1$ in the winding portions 65, 67, predominantly a Lorentz force $F_Z$ extending substantially parallel to the Z-direction is exerted on said winding portions 65, 67. By means of the Lorentz forces $F_X$ and $F_Z$, said two degrees of freedom of the second part 41 of the linear motor are thus fixed with respect to the first part 39 by the linear motor 29. By using the three Hall sensors 79, 81, 83 and the control loop formed by the control unit 77 and the Hall sensors 79, 81, 83, it becomes possible to very accurately adjust and maintain the desired mutual X-position and angle α of the two parts 39, 41 of the linear motor 29.

In the above-described example of the scanning device 1, a constant value of the angle α, i.e. the inclination of the first part 39 and the second part 41 of the linear motor 29 with respect to each other about the shaft 73, is maintained by the linear motor 29. The linear motor 29 can also be used, however, to actively control said angle α and hence preclude an undesirable local inclination of the information carrier 11 with respect to the objective lens 23 of the scanning unit 13. In such an alternative embodiment of a scanning device in accordance with the invention, the scanning unit 13 comprises, for example, an optical sensor, which is known per se and commonly used, for measuring a local inclination of the information carrier 11 with respect to the objective lens 23. Such a local inclination can develop, for example, if the information layer 37 of the information carrier 11 is not completely flat or if the table 3 is not completely perpendicular with respect to the axis of rotation 7. Said optical sensor generates an output signal, which corresponds to the measured local inclination and is supplied to said control element of the scanning device. The control element determines an inclination α between the two parts 39, 41 of the linear motor 29, which inclination is necessary to compensate for the undesirable local inclination, and supplies a signal $u_{\alpha 0}$ to the control unit 77 of the linear motor 29, which signal corresponds to the inclination α thus determined by the control element.

As the coil system 51 comprises three coils 53, 55, 57, the pitch $p_C$ between the coils 53, 55, 57 being 2/3 or 4/3 times the pitch $p_M$ between the magnets 47, 49, and the two parts 61, 63 of each coil 53, 55, 57 having a mutual pitch $p_{CP}$ which is equal to the pitch $p_M$ between the magnets 47, 49, in each position of the second part 41 with respect to the first part 39, two of the three coils 53, 55, 57 are available for generating a Lorentz force which is directed substantially parallel to the X-direction, and in each position one of the three coils 53, 55, 57 is available for generating a Lorentz force which is directed substantially parallel to the Z-direction. As, in the situation shown in FIG. 3, the magnetic field lines actually also have a small component in the X-direction at the location of the second coil 55 and the third coil 57, in addition to the Lorentz forces $F_X$, also a small Lorentz force parallel to the Z-direction is generated by interaction between the currents $i_2$ and $i_3$ and the magnetic field. For similar reasons, apart from the Lorentz force $F_Z$, also a small Lorentz force parallel to the X-direction is generated by interaction between the current $i_i$ and the magnetic field. As a result, viewed in a direction parallel to the X-direction, in each position of the second part 41 with respect to the first part 39, a Lorentz force can be generated which extends parallel to the X-direction and a Lorentz force can be generated which extends parallel to the Z-direction, so that the linear motor 29 enables a uniform, continuous drive of the second part 41 in a direction parallel to the X-direction, and guidance of the second part 41 in a direction parallel to the Z-direction. It is noted however, that the invention also includes embodiments of a scanning device, wherein the coil system of the linear motor is differently constructed. In each embodiment, however, the coil system must comprise winding portions which are directed substantially perpendicularly to the directions of magnetization of the magnets and perpendicularly to the straight guide, the control unit admitting an electric current to said winding portions and controlling said current if said winding portions are situated in said magnetic transition field between two magnets having opposite directions of magnetization.

It is further noted that the invention also includes embodiments of a scanning device wherein the first part of the linear motor is differently constructed. An example of such a motor is, for example, a linear motor the first part of which comprises only a single row of permanent magnets having alternately opposite directions of magnetization, the magnets being arranged, viewed in the Z-direction, directly opposite the coil system. Another alternative embodiment of such a motor is a linear motor, the first part of which comprises a single row of permanent magnets having alternately opposite directions of magnetization, the magnets being arranged, viewed in the Y-direction, next to the coil system. In such an alternative embodiment, viewed in the Z-direction, each magnet is provided between a pair of individual yoke plates extending parallel to the Y-direction, and, viewed in a direction parallel to the Z-direction, the coil system is arranged between the successive pairs of yoke plates. The magnetic field of each permanent magnet is guided to the slit between the yoke plates by the relevant pair of yoke plates, as a result of which a magnetic field comparable to the magnetic field shown in FIG. 3 develops at the location of the coil system. In addition, the invention also includes embodiments wherein the second part is secured with the electric coil system in a fixed position to the frame of the scanning device, and wherein the first part is displaceably guided with the permanent magnets with respect to the second part. In such an alternative embodiment, the second part comprises, for example, a row of electric coils extending parallel to the X-direction, while the first part comprises a limited number of pairs of magnets having opposite directions of magnetization.

The above-described example of the scanning device 1 in accordance with the invention can suitably be used for scanning an optically scannable information carrier 11. For this purpose, the scanning device 1 comprises an optical scanning unit 13. It is noted that the invention also comprises scanning devices which can suitably be used to scan another type of information carriers, for example magneto-optical information carriers or magnetic information carriers.

Finally, it is noted that, in a scanning device in accordance with the invention, the mutual positions of the two parts 39, 41 of the linear motor 29 can also be measured by means of a different type of sensors. Said different type of sensors may be, for example, optical sensors or inductive sensors.

What is claimed is:

1. A scanning device for scanning a disc-shaped information carrier, which scanning device is provided with a table which can be rotated about an axis of rotation and on which an information carrier can be placed, and with a scanning unit, and a linear motor by means of which the scanning unit can be displaced with respect to the table predominantly in a radial direction, which linear motor is provided with a first and a second part which are displaceably guided with respect to each other by means of a straight guide, the first part being provided with pairs of magnets having opposite directions of magnetization directed substantially perpendicularly to the guide, and the second part being provided with an electric coil system comprising winding portions extending substantially perpendicularly to the directions of magnetization and perpendicularly to the guide, and the linear motor being provided with a control unit for controlling an electric current in the coil system, characterized in that, in operation, the control unit admits an electric current to at least one of said winding portions and controls said electric current, if said winding portion is situated in a magnetic transition field between two adjacent magnets having opposite directions of magnetization.

2. A scanning device as claimed in claim 1, characterized in that the guide comprises a single round shaft and at least one bushing provided around said shaft.

3. A scanning device as claimed in claim 2, characterized in that the control unit uses a measured mutual position of the two parts of the linear motor to determine a mutual inclination of the two parts about said shaft, while the control loop uses the measured inclination to adjust a desired mutual inclination of the two parts about said shaft.

4. A scanning device as claimed in claim 1, characterized in that the linear motor comprises a sensor for measuring a mutual position of the two parts of the linear motor in a direction parallel to the directions of magnetization, and in that the control unit comprises a control loop for adjusting a desired mutual position of the two parts by means of a signal supplied by the sensor, which signal corresponds to a measured mutual position of the two parts.

5. A scanning device as claimed in claims 4, characterized in that the electric coil system further comprises three coils and the sensor comprises three Hall sensors, which each measure the strength of a magnetic field originating from the magnets and present near, respectively, one of the three coils.

6. A scanning device as claimed in claim 1, characterized in that the coil system comprises at least three electric coils, which each include two parts having winding portions extending substantially perpendicularly to the directions of magnetization and perpendicularly to the guide, a pitch which substantially corresponds to a pitch between two adjacent magnets having opposite directions of magnetization being present between the two parts of each coil, and a pitch which is substantially equal to 2/3 or 4/3 times the pitch between said two magnets being present between each pair of coils of said three coils.

7. A scanning device as claimed in claim 1, characterized in that the first part of the linear motor is provided with two rows of permanent magnets extending substantially parallel to the guide, the pitch between said permanent magnets being substantially constant, each pair of adjoining magnets of each row having opposite directions of magnetization, the two rows being arranged, viewed in a direction parallel to the directions of magnetization, at some distance from each other, and each pair of oppositely arranged magnets of the two rows having equal directions of magnetization, and said winding portions of the coil system, viewed in a direction parallel to the magnetization direction, being situated between the two rows so as to be closer to one row than to the other row.

8. A scanning device for scanning a disc-shaped information carrier upon a table rotated about an axis of rotation, and a linear motor capable of displacing the scanning unit with respect to the table in a radial direction, the linear motor being provided with a first and a second part which are displaceable with respect to each other by means of a straight guide, the first part being provided with pairs of magnets having opposite directions of magnetization directed substantially perpendicularly to the guide, and the second part being provided with an electric coil system comprising winding portions extending substantially perpendicularly to the directions of magnetization and perpendicularly to the guide, and the linear motor being provided with a control unit for controlling an electric current in the coil system, characterized in that the guide comprises a single round shaft and at least one bushing provided around said shaft, and wherein the control unit uses a measured mutual position of the two parts of the linear motor to determine a mutual inclination of the two parts about said shaft.

9. A scanning device as claimed in claim 8 wherein the control unit comprises a control loop for adjusting a desired mutual position of the two parts by means of a signal supplied by the sensor, which signal corresponds to a measured mutual position of the two parts.

10. A scanning device as claimed in claim 9 wherein the control loop uses the measured inclination to adjust a desired mutual inclination of the two parts about said shaft.

11. A scanning device as claimed in claim 8 wherein the control unit admits an electric current to at least one of said winding portions and controls said electric current, if said winding portion is situated in a magnetic transition field between two adjacent magnets having opposite directions of magnetization.

12. A scanning device as claimed in claim 8 wherein the linear motor comprises a sensor for measuring a mutual position of the two parts of the linear motor in a direction parallel to the directions of magnetization, and in that the control unit comprises a control loop for adjusting a desired mutual position of the two parts by means of a signal supplied by the sensor, which signal corresponds to a measured mutual position of the two parts.

13. A scanning device as claimed in claim 8 wherein the coil system comprises at least three electric coils, which each include two parts having winding portions extending substantially perpendicularly to the directions of magnetization and perpendicularly to the guide, a pitch which substantially corresponds to a pitch between two adjacent magnets having opposite directions of magnetization being present between the two parts of each coil, and a pitch which is substantially equal to 2/3 or 4/3 times the pitch between said two magnets being present between each pair of coils of said three coils.

14. A scanning device as claimed in claim 8 wherein the sensor comprises three Hall sensors, which each measure the strength of a magnetic field originating from the magnets and present near, respectively, one of the three coils.

15. A scanning device as claimed in claim 8 wherein the first part of the linear motor is provided with two rows of permanent magnets extending substantially parallel to the guide, the pitch between said permanent magnets being substantially constant, each pair of adjoining magnets of each row having opposite directions of magnetization, the two rows being arranged, viewed in a direction parallel to the directions of magnetization, at some distance from each other, and each pair of oppositely arranged magnets of the two rows having equal directions of magnetization, and said winding portions of the coil system, viewed in a direction parallel to the magnetization direction, being situated between the two rows so as to be closer to one row than to the other row.

* * * * *